(No Model.)
J. H. JONES.
SEEDING MACHINE.
No. 429,572. Patented June 3, 1890.
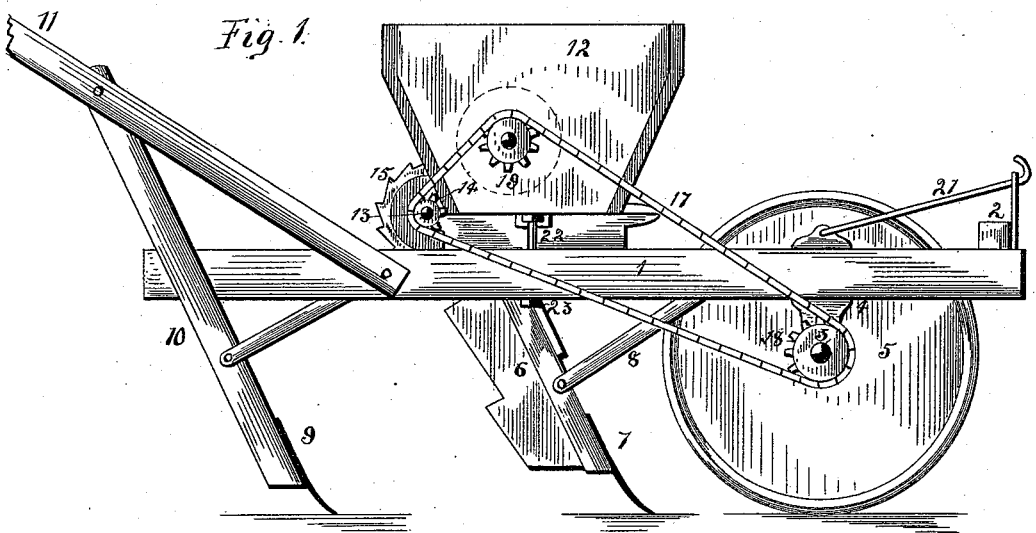
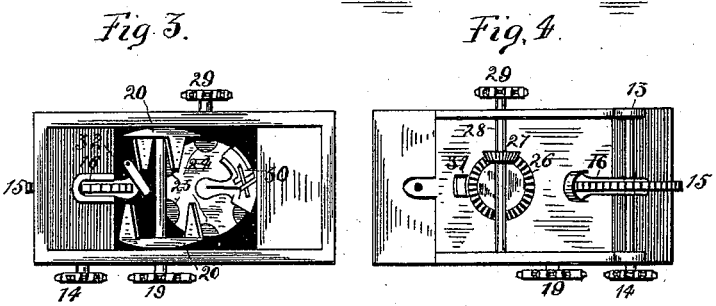
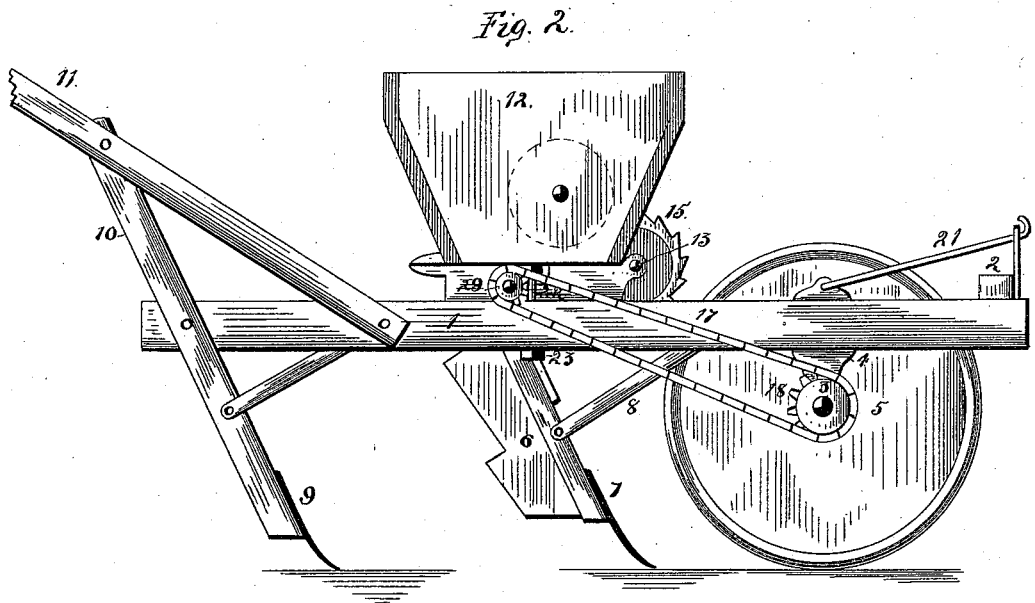
Witnesses:
L. L. Miller
J. W. Southworth
Inventor:
James Henra Jones
By A. O. Behel
Atty.

UNITED STATES PATENT OFFICE.

JAMES HERVA JONES, OF ROCKFORD, ILLINOIS, ASSIGNOR TO EMERSON, TALCOTT & COMPANY, OF SAME PLACE.

SEEDING-MACHINE.

SPECIFICATION forming part of Letters Patent No. 429,572, dated June 3, 1890.

Application filed February 13, 1890. Serial No. 340,326. (No model.)

*To all whom it may concern:*

Be it known that I, JAMES HERVA JONES, a citizen of the United States, residing at Rockford, in the county of Winnebago and State of Illinois, have invented certain new and useful Improvements in Seeding-Machines, of which the following is a specification.

The object of this invention is to equip a seed-box with a cotton and corn planting device arranged with respect to the seed-discharging spout so that the box can be reversed to bring the discharge-opening of either the cotton or corn planting device over the discharge-spout, thereby employing but a single power-wheel and one discharge-spout.

In the accompanying drawings, Figure 1 is a side elevation of a seeding-machine embodying my invention, in which the cotton-feeding device is shown in operation. Fig. 2 is also a side elevation of the same machine, showing the corn-feeding device in operation. Fig. 3 is a plan view of the seed-box. Fig. 4 is an under face representation of the seed-box.

The main frame consists of the lengthwise beams 1, connected by a front cross-bar 2. An axle 3 is supported in depending brackets 4, secured to the beams 1, and a wheel 5 is mounted on its shaft. A seed-discharge spout 6 has a connection with the main frame, and a furrow-opening shovel 7 is secured to its lower end. Braces 8, connected to the discharge-spout and with the main frame, hold the spout in a rigid manner. Covering-shovels 9 are connected to shovel-standards 10, and handles 11 have a connection with the main frame. A seed-box 12, in this instance of rectangular form, is equipped with a cotton and corn planting device.

The cotton-feeding device consists of a horizontal shaft 13, supported to revolve in bearings and having a sprocket-wheel 14 secured to one of its ends. A saw-toothed wheel 15 is mounted on the shaft between its bearings and extends through a slot 16 in the end and bottom of the seed-box. A chain belt 17 connects the sprocket-wheel 14 with the carrying-wheel 5 by engaging the teeth of the sprocket-wheel 18, mounted on the projecting end of the axle 3. This chain belt also passes around the sprocket-wheel 19, which imparts a rotary movement to the agitating-disks 20 within the seed-box.

When the machine is drawn forward by attaching a horse to the draft-link 21, a rotary movement will be imparted to the supporting-wheels, and by reason of its chain-connection with the cotton-feeding disk a rotary movement will also be imparted to it, so that its teeth will carry the cotton-seed downward through the opening in the bottom of the seed-box, and will be discharged into the discharge-spout and conveyed to the ground, and the parts will occupy the positions shown in Fig. 1.

The bolts 22 connect the seed-box with the supporting-frame by the bolt passing through the lengthwise beams and receiving a screw-nut 23 on its projecting end. By loosening these screw-bolts the seed-box can be turned end for end, and secured in position, as shown at Fig. 2. When the box has been thus reversed, the corn-planting device will be so located as to discharge the corn into the discharge-spout. The corn-feeding device in this instance consists of a rotary seed-disk 24, located in the bottom of the seed-box, and is provided with seed-cups 25. The under side of this disk is in beveled toothed gear form, as shown at 26, which engages the teeth of a beveled toothed pinion 27, mounted on a transverse shaft 28, which has a sprocket-wheel 29 secured to its projecting end. A seed cut-off 30 is so located as to permit the seed-openings in the seed-wheel to pass under it and prevent an excessive number of kernels of corn from being carried to the discharge-opening 31 in the bottom of the seed-box. The chain belt 17 is shortened so as to drive the seed-wheel from the supporting-wheel, as shown at Fig. 2.

When the corn-planting device is in operation, I close the opening necessary for the cotton-seed wheel by a pivoted plate 32, which is swung against the wheel, and also prevents the cotton-seed wheel from revolving.

By the above construction I produce a simple and cheap combined cotton and corn planting machine, which is driven from the same driving-wheel.

In the drawings I have shown and in the specification described the construction of cotton and corn planting devices such as I prefer in the manufacture of my improved seeding-machine, but it is evident that other constructions may be used and still be within the meaning of my invention.

I claim as my invention—

1. In a seeding-machine, the combination of a supporting-frame, a discharge-spout, and a seed-box carrying cotton and corn feeding devices, said box made reversible, so as to bring the discharge-opening of either the cotton or corn feeding device over the discharge spout, substantially as set forth.

2. In a seeding-machine, the combination of a supporting-frame, a discharge-spout, a seed-box carrying cotton and corn feeding devices, said box made reversible, so as to bring the discharge-opening of either the cotton or corn feeding device over the discharge-spout, and means for imparting movements to the planting devices, substantially as set forth.

JAMES HERVA JONES.

Witnesses:
A. O. BEHEL,
L. L. MILLER.

It is hereby certified that in Letters Patent No. 429,572, granted June 3, 1890, upon the application of James Herva Jones, of Rockford, Illinois, for an improvement in "Seeding-Machines," errors appear in the printed specification requiring correction, as follows: In lines 19, 21, and 75, page 1, and lines 13, 16, 20, and 23, of page 2, the word "feeding" should read *planting;* and that the Letters Patent should be read with these corrections therein that the same may conform to the record of the case in the Patent Office.

Signed, countersigned, and sealed this 8th day of July, A. D. 1890.

[SEAL.]

CYRUS BUSSEY,
*Assistant Secretary of the Interior.*

Countersigned:

C. E. MITCHELL,
*Commissioner of Patents.*